March 5, 1963 J. V. MAJEWSKI Re. 25,341

SECONDARY LEAD BRACKET

Original Filed May 20, 1959

INVENTOR.
John V. Majewski
BY Charles Grudell
Attorney

United States Patent Office

Re. 25,341
Reissued Mar. 5, 1963

25,341
SECONDARY LEAD BRACKET

John V. Majewski, Hales Corners, Wis., assignor to McGraw-Edison Company, Milwaukee, Wis., a corporation of Delaware Original No. 3,005,613, dated Oct. 24, 1961, Ser. No. 814,528, May 20, 1959. Application for reissue Dec. 8, 1961, Ser. No. 158,654
3 Claims. (Cl. 174—158)

Matter enclosed in heavy brackets [ ] appears in the original patent but forms no part of this reissue specification; matter printed in italics indicates the additions made by reissue.

This invention relates to mounting brackets and more particularly to electrical insulator mounting brackets. Although my mounting bracket is adapted for use with a variety of electrical apparatus, it is particularly suited for use with and will be described with particular reference to electrical distribution transformers.

An object of this invention is to provide a mounting bracket that can be used in combination with a number of different mounting surfaces and which will provide stable support when so used.

Another object of this invention is to provide a mounting bracket which allows ready assembly of articles to be supported thereby after the mounting bracket is connected to a mounting surface, and which allows for replacement of articles supported thereby without disturbing the connection between mounting bracket and mounting surface.

A further and more specific object of this invention is to provide a mounting bracket that will hold the secondary leads of an electrical distribution transformer in spaced relation to the transformer, and which will guide the secondary leads between the secondary bushings of the transformer and a secondary rack.

In accordance with my invention, the mounting bracket includes a mounting strap and an elongated mounting stud threadedly engaging the mounting strap. The mounting strap fits over an edge of a mounting surface and the ends thereof engage opposite sides of the mounting surface at relatively spaced apart points thereon. The elongated mounting stud engages the mounting surface at a point spaced relative to both points of engagement between the mounting strap and mounting surface and in combination with the mounting stap imparts a three point clamping action to the mounting surface. Further, the head of the elongated mounting stud is so formed as to allow articles that are to be supported by the mounting bracket, such as electrical spool insulators, to be assembled thereon without disturbing the connection between the mounting bracket and mounting surface.

Figure 1:
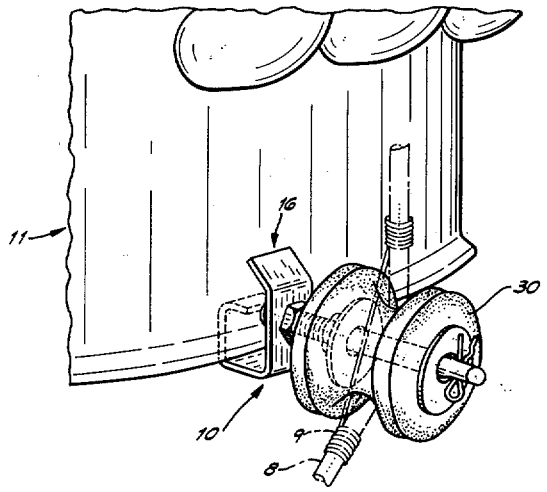
Figure 2:
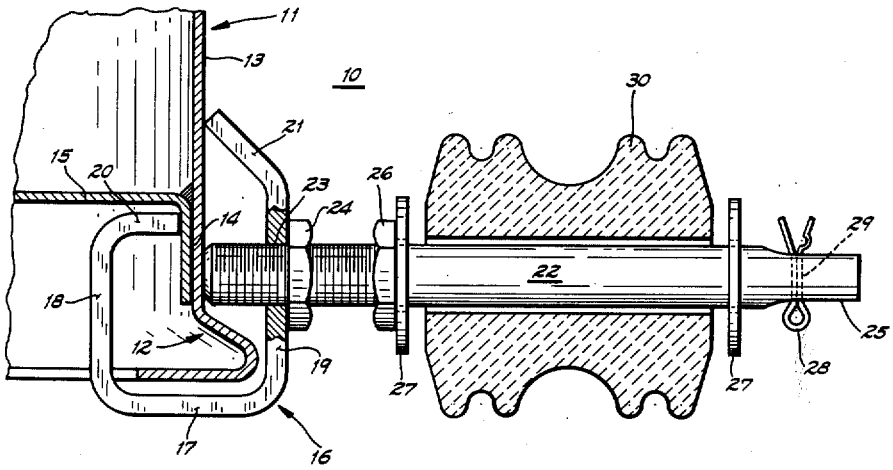

Further objects and advantages of my invention will be apparent from a reading of the following detailed description in connection with the drawings in which:

FIG. 1 is a perspective view illustrating an application of my invention in combination with an electrical transformer; and, FIG. 2 is a side view, partly in section, of my mounting bracket and also illustrates the connection between it and the transformer of FIG. 1.

In the application of my invention illustrated in the drawings, the mounting bracket 10 fits over a lower rim 12 of a transformer 11, and supports a spool type electrical insulator 30 at a point between the secondary bushings (not shown) of the transformer 11 and a secondary rack (not shown). In the illustrated application of my mounting bracket 10 a secondary lead 8, shown by dot-dash lines for conveniency, of the transformer 11 is tied to the electrical insulator 30 in a suitable manner, preferably by means of the wire 9. The secondary lead is held in fixed relation with the transformer 11 and is guided from the secondary bushings to the secondary rack. It should be noted that my mounting bracket may be used with any suitable mounting surface, however, its preferred use is as shown, in combination with a distribution transformer. Tying the secondary leads 8 to the mounting bracket 10 substantially limits the movement of the secondary leads, which is especially advantageous when the transformers 11 are gang mounted. Holding the secondary leads in spaced relation with the transformer 11 eliminates the possibility of the electrical insulation on the leads wearing due to constant rubbing against the transformer 11.

Referring now to FIG. 2, the mounting bracket 10 includes a mounting strap 16 which fits over the lower rim 12 of the transformer 11. The lower rim 12 is in the lower portion of the transformer 11 and is formed by the juncture of the lower transformer tank wall 14 and the transformer tank bottom 15. The mounting strap 16 comprises a substantially horizontal base portion 17 which is disposed below the lower rim 12, and first and second vertical leg portions 18 and 19 extending from opposed ends of the horizontal portion 17 and connected thereby. The first and second vertical portions 18 and 19 and the horizontal portion 17 form a generally U-shaped member which fits over the rim 12 of the transformer 11 with the vertical portions 18 and 19 respectively extending along the inner and outer surfaces of the lower rim 12. The upper end of the vertical leg portion 18 is turned inwardly to form a substantially horizontal end portion 20, which engages the inner surface of lower rim 12. The upper end of the vertical portion 19 is turned inwardly toward the outer surface of wall 13 and extends upwardly at an angle to form a sloping end portion 21. The sloping end portion 21 engages the outer surface of the tank wall 13 at a point spaced vertically above the point of engagement between the horizontal end portion 20 and the lower rim 12.

The mounting bracket 10 also includes bolt means preferably in the form of an elongated mounting stud 22 which engages a threaded hole 23 in the vertical leg portion 19, the axis of the stud being spaced vertically below the point of engagement of the end portion 20 and the lower rim 12. The mounting stud 22 extends through the vertical portion 19 and abuts the outer surface of the lower rim 12 and clampingly engages the rim to hold the portions 20 and 21 of the strap 16 in firm engagement with lower rim 12. The mounting stud 22 and the mounting strap 16 combine to transmit this clamping force to the lower rim 12 and the transformer tank wall 13.

The mounting bracket 10 engages the mounting surface at three relatively spaced points, that is, the point at which the mounting stud 22 engages the lower rim 12, the point at which the horizontal end portion 20 engages the inner surface of the rim 12, and the point at which the sloping end portion 21 engages the outer surface of the tank wall 13. The clamping force produced by the mounting stud 22 is transmitted to the portion 21 by reason of a cantilever action on the portion 21. In contrast with the common C-type clamp, wherein the gripping action occurs generally only at one point, my mounting bracket 10 is more stable as it grips a mounting surface at a plurality of spaced apart points each in opposition to the other. Also, because the forces applied to each of the spaced points are in opposition, the end portions 20 and 21 offer resistance to forces tending to rotate the mounting bracket 10 in a clockwise or counterclockwise direction about the lower rim 12. Therefore, in addition to providing an initially secure seat, my mounting bracket 10 has a greater tendency to remain securely seated. A lock nut 24 is provided to insure against loosening of the mounting stud 22 and the mounting strap 16.

It will be noted that the mounting stud 22 directly engages the lower rim 12 and may abrade the finish thereof. This abrasion is considered desirable as it insures a good electrical contact with the transformer to minimize radio and television interference. In this connection it should also be noted that the stability of my mounting bracket 10, which resists loosening forces, also contributes to the reduction of radio and television interference.

It will be understood by those skilled in the art that the sloping end portion 21 could be formed to extend in a direction substantially perpendicular to the vertical portion 19. However, the sloping configuration is preferred as it provides a mounting bracket 10 which will accommodate mounting surfaces of varying configuration while utilizing the least amount of material. For example, the vertical distance between the sloping end 21 and the horizontal end 20 must be sufficiently great to allow the mounting strap 16 to be assembled over a mounting surface having the configuration of the lower lip 12 of transformer 11 as illustrated in FIG. 2. Using a horizontal rather than sloping end portion 21 would necessitate extending the vertical leg portion 19 higher to provide the same spacing and hence would require more material.

The mounting stud 22 is of substantially the same circumference for its entire length and the head thereof is provided with means which allows the stud 22 to be tightened against the lower rim 12. Preferably the mounting stud 22 is provided with a flattened head portion 25 which provides a surface upon which a wrench or other suitable tightening means may be applied to the stud 22. By providing means, such as the flattened head portion 25, which does not substantially increase the size of the head of stud 22, it is possible to assemble articles, such as the electrical insulator 30, after the mounting bracket 10 has been connected, without disturbing the secure mounting seat. Further, should it become necessary in the field to replace the electrical insulator 30, the mounting bracket 10 need not be disturbed as the electrical insulator 30 can be removed and a new electrical insulator 30 assembled without loosening the mounting stud 22. This is advantageous from the standpoint that once a firm stable seat has been provided for the mounting bracket 10 it need not be disturbed for the replacement of the articles supported thereby.

The spool type electrical insulator 30 is confined on the mounting stud 22 by means of a nut 26, a pair of washers 27, and a self-locking cotter pin 28, the electrical insulator 30 being disposed between the washers 27, one of which is seated against the nut 26 and the other of which is disposed at the opposite end of electrical insulator 30. The self-locking cotter pin 28 fits into a hole 29 provided in the flattened head portion 25 and prevents the spool from being accidentally disengaged from the mounting bracket 10. Also, the use of the self-locking cotter pin 28 provides for ready, reliable removal of the electrical insulator 30 as well as for replacement thereof.

From the foregoing it will be obvious to those skilled in the art that I have provided a mounting bracket which will exert a clamping force on a mounting surface at three relatively spaced apart positions, thereby providing a support which is relatively more stable than that available from the prior art. My mounting bracket being more stable will have less tendency to wobble and when once seated securely against a mounting surface will not loosen and contribute to radio and television interference. Further, my mounting bracket allows the initial assembly of and subsequent replacement of electrical insulators without disturbing the secure seat of the mounting bracket. Also, my mounting bracket accommodates varied shaped mounting surfaces while still utilizing a minimum of material in the fabrication thereof.

Although I have discussed my invention with regard to a specific application therof, it is not intended that it be limited thereto, and in the appended claims it is intended to cover all modifications which fall within the true spirit and scope of my invention.

What I claim is:

[1. A mounting bracket comprising, in combination, a generally U-shaped member, the ends of the leg portions of said U-shaped member extending generally toward one another and engaging opposite sides of a mounting structure, the points of engagement between the ends of said legs and said mounting structure being spaced longitudinally one from the other along the surface of said mounting structure, and means engaging one of said legs and abutting against said mounting structure at a point spaced intermediate the points of engagement of said legs and said mounting structure for affixing said U-shaped member to said mounting structure.]

[2. A bracket for use with a mounting structure having substantially opposed sides comprising, in combination, a mounting strap including a generally U-shaped member, the legs of said U-shaped member being disposed on opposite sides of said mounting structure and portions of said legs extending generally toward one another and abutting upon opposite sides of said mounting structure at points generally vertically spaced from one another, and adjustable means engaging one of said legs and abutting against one side of said mounting structure at a point intermediate the points of abutment of said leg portions and said mounting structure for imparting together with said strap a three point clamping action to said mounting structure.]

[3. The bracket of claim 2 wherein said adjustable means constitutes an insulator mounting stud.]

[4. An insulator mounting bracket for use with a mounting structure having substantially opposed sides comprising, in combination, a first leg, a second leg, and a basal portion connecting said first and second legs, said first leg having a generally transverse portion which abuts upon one side of said mounting structure, said second leg having a generally transverse portion which abuts upon the opposite side of said mounting structure at a point generally vertically spaced from the point of abutment of said first leg and said mounting structure, and an elongate mounting stud threadedly engaging said second leg and abutting against said opposite side of said mounting structure at a point intermediate the points of abutment of said legs and said mouning structure.]

*5. In combination, a generally U-shaped member having a bight portion and first and second leg portions, the ends of the leg portions of said U-shaped member being integral with and bent generally transversely of said leg portions and extending generally toward one another, said first leg portion being longer than said second leg portion, the outer ends of said leg portions being spaced one from the other in a direction longitudinally of said leg portions, an insulator, stud means carrying said insulator, said stud means being mounted on said first of said leg portions so as to extend tranversely thereof and being spaced in a direction toward the bight of said U from the ends of said leg portions, said stud means being axially adjustable, the end of said second of said leg portions being opposed to and intermediate the end of said first leg portion and the inner end of said stud means.*

*6. An insulator bracket for use with a mounting structure having substantially opposed sides comprising, in combination, a mounting strap including a generally U-shaped member having a bight portion and first and second leg portions, the ends of the leg portions of said U-shaped member being integral with and bent generally transversely of said leg portions and extending generally toward one another, said first leg portion being longer than said second leg portion, the outer ends of said leg portions being spaced one from the other in a direction longitudinally of said leg portions, the first of said leg portions having a threaded aperture therein spaced in a direction*

*toward the bight of said* U *from the ends of said leg portions, an insulator mounting stud means threaded within said aperture for axial adjustment transversely of said first leg portion, the end of said second of said leg portions being opposed to and intermediate the end of said first leg portion and the inner end of said stud means.*

*7. In combination, a first leg, a second leg and a basal portion integral with and connecting said first and second legs, the ends of said legs being integral therewith and bent generally transversely of said legs and extending generally toward one another, said second leg being shorter than said first leg, the outer end of said second leg being spaced from the outer end of said first leg in a direction longitudinally of said legs, an insulator spool having an axial opening therethrough, an elongated mounting stud passing through said axial opening, said stud being mounted on and in threaded engagement with said first leg for axial adjustment transversely thereof at a locus spaced from the ends of said legs in a direction toward said basal portion, the end of said second of said legs being opposed to and intermediate the end of said first leg and the inner end of said mounting stud.*

References Cited in the file of this patent or the original patent

UNITED STATES PATENTS

| | | |
|---|---|---|
| 201,863 | Burnett | Apr. 2, 1878 |
| 751,490 | Filler | Feb. 9, 1904 |
| 759,560 | Sharp | May 10, 1904 |
| 1,076,211 | Korns | Oct. 21, 1913 |
| 2,305,541 | Luecke | Dec. 15, 1942 |
| 2,437,344 | Behlmann | Mar. 9, 1948 |
| 2,756,031 | Sanstrom | July 24, 1956 |
| 2,996,570 | Wilson | Aug. 15, 1961 |
| 2,998,477 | Hollander | Aug. 29, 1961 |

OTHER REFERENCES

Publication I: A. B. Chance Co. Advertisement, Electrical World, June 30, 1958, page 69.